March 11, 1952  A. J. McMASTER ET AL  2,589,194
OVERLOAD RELEASE MECHANISM
Filed Jan. 12, 1949  3 Sheets-Sheet 1

INVENTOR.
Archie J. McMaster
William H. Kitto
BY
Attys.

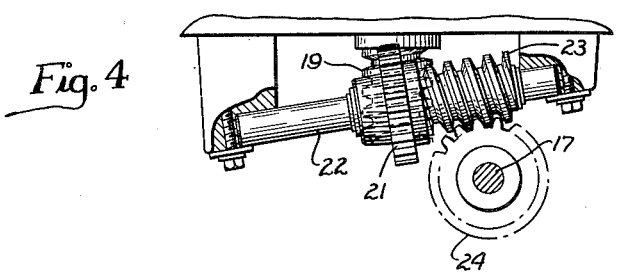
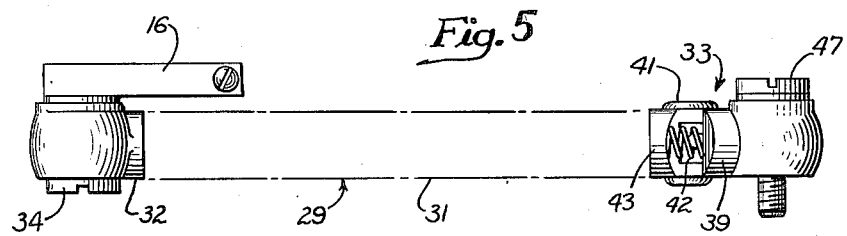
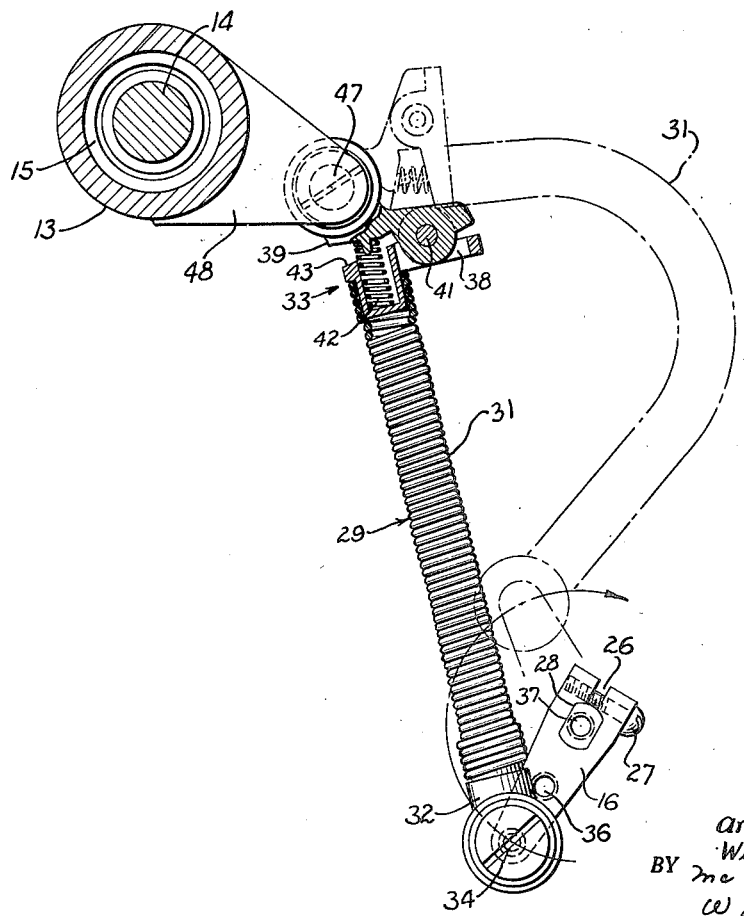

March 11, 1952  A. J. McMASTER ET AL  2,589,194
OVERLOAD RELEASE MECHANISM
Filed Jan. 12, 1949  3 Sheets-Sheet 3
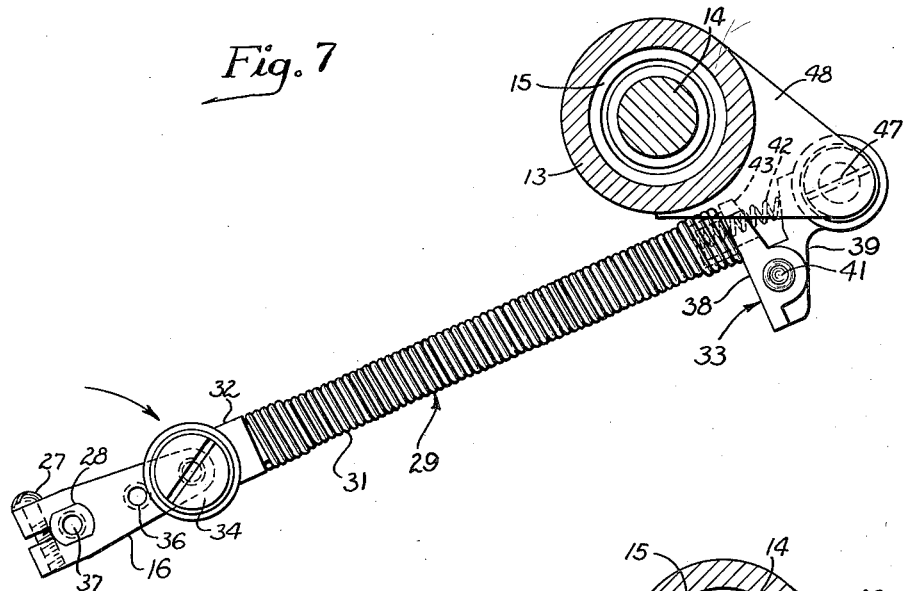
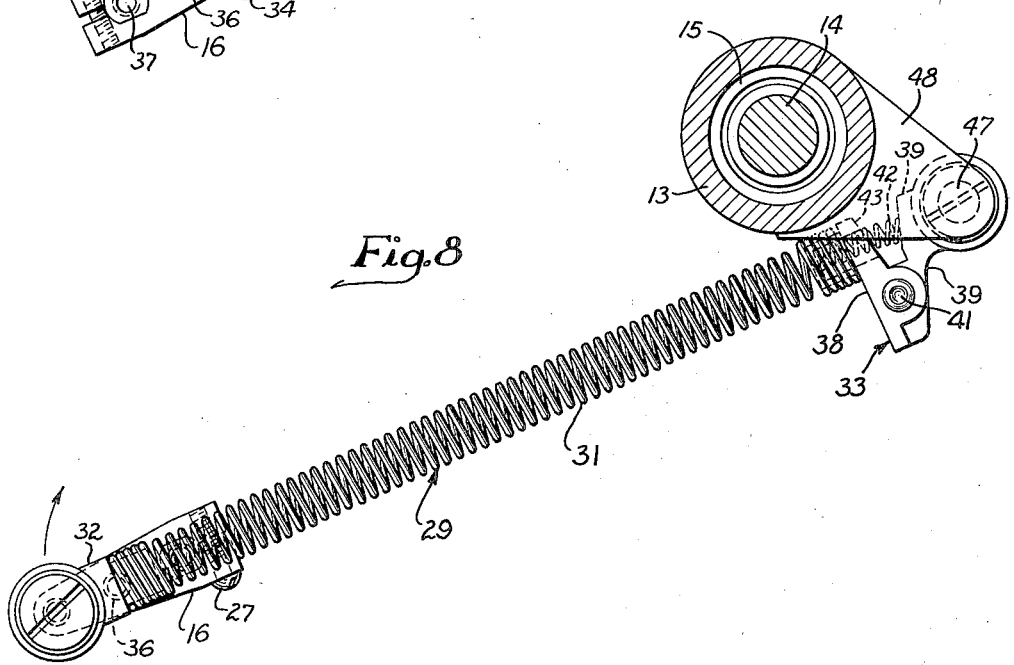
INVENTORS
Archie J. McMaster
William H. Kitto
BY McLaughlin and
Wallenstein
Attys.

Patented Mar. 11, 1952

2,589,194

UNITED STATES PATENT OFFICE 2,589,194

OVERLOAD RELEASE MECHANISM

Archie J. McMaster and William H. Kitto, Chicago, Ill., assignors to G-M Laboratories, Inc., Chicago, Ill., a corporation of Illinois Application January 12, 1949, Serial No. 70,576

9 Claims. (Cl. 74—70)

Our invention relates to mechanical overload release devices.

There are many instances in which motion is translated from one member to another in which it is desirable to provide an overload release mechanism. The motion involved may be linear or rotary, and the specific reason for providing a release on overload of the mechanism may vary with the type of installation or function involved. One illustrative and important application has to do with large fan installations. Very large air circulators, as a rule, are not provided with oscillating means because if the support for the fan is firm, as, for example, a wall bracket, the oscillation of the fan may injure a person or object projected into its path. In those installations in which the fan is mounted on a stand, the stand may be tipped in the event the oscillation of the fan is in any way interfered with.

The principal object of our invention is the provision of an improved overload release device particularly adapted for use where rotary motion is involved, but also having utility where linear or nontruly rotary motions are used.

Another object of the invention is the provision of an improved oscillating linkage for electric fans and the like.

In accordance with the main features of our invention, we provide a link connection between the driving and driven members in the form of a helical spring so connected to the driving and driven members that the application of force in compression is normally along the axis of the spring link. Load responsive means is provided for changing the angle at which compressive load is applied to the spring link so that in the event of more than normal compressive load, the spring link will buckle and the connection between driving and driven members will be interrupted. The spring link is also designed to sustain an adequate load in tension but to permit stretching of the spring if more than normal or intended load is encountered, so that in tension there will also be no movement of the driven member if more than the intended load is applied.

In the drawings we show one embodiment of the invention in which the overload device is associated with an oscillating fan. In the drawings, Fig. 1 is a side elevational view of the fan supported on a wall bracket;

Fig. 2 is an enlarged sectional view taken on the line 2—2 of Fig. 1, looking in the direction of the arrows, and showing the manner in which the oscillating linkage is driven;

Figs. 3 and 4 are fragmentary sectional views, partly in elevation, taken on the lines 3—3 and 4—4 respectively of Fig. 2 looking in the direction of the arrows;

Fig. 5 is a side elevational view of the spring link showing the connections at the two ends thereof, the view being from an angle looking from the reverse side of Fig. 1;

Fig. 6 is a bottom plan view of Fig. 5, showing the manner in which the spring link buckles when more than normal compressive load is applied thereto;

Fig. 7 is a bottom plan view showing the parts in the position which they occupy immediately after the link has been driven in compression and just before a load in tension is applied thereto; and Fig. 8 is a view similar to Fig. 7 but showing the manner in which the spring link stretches if movement of the driven load is arrested.

Figure 1:
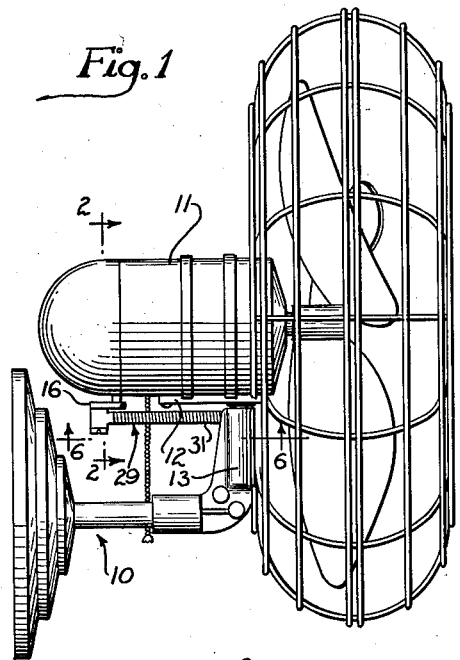

Referring now to the drawings, the invention is shown applied to a large type of fan frequently supported on a floor stand, but here shown carried on a wall bracket 10. The fan itself has a housing 11, to the bottom of which a bracket 12 is secured. The housing bracket 12 and wall bracket 10 are suitably shaped to provide between them a pivoted support for the fan, including the housing 11 and associated parts. In the drawings we show a tubular portion 13 (note Fig. 6) comprising a part of the wall bracket, into which extends a shank 14 projecting downwardly from the fan housing bracket 12. We indicate a friction reducing bearing 15 between the tube 13 and shank 14, but any suitable construction may be used. Our invention is not concerned with the manner of pivotally supporting the fan, but with the provision of overload release mechanism forming a part of the oscillating drive between the fan and its support.

Figure 3:
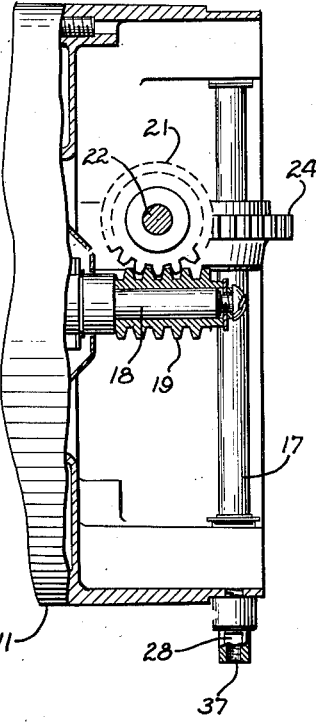
Figure 2:
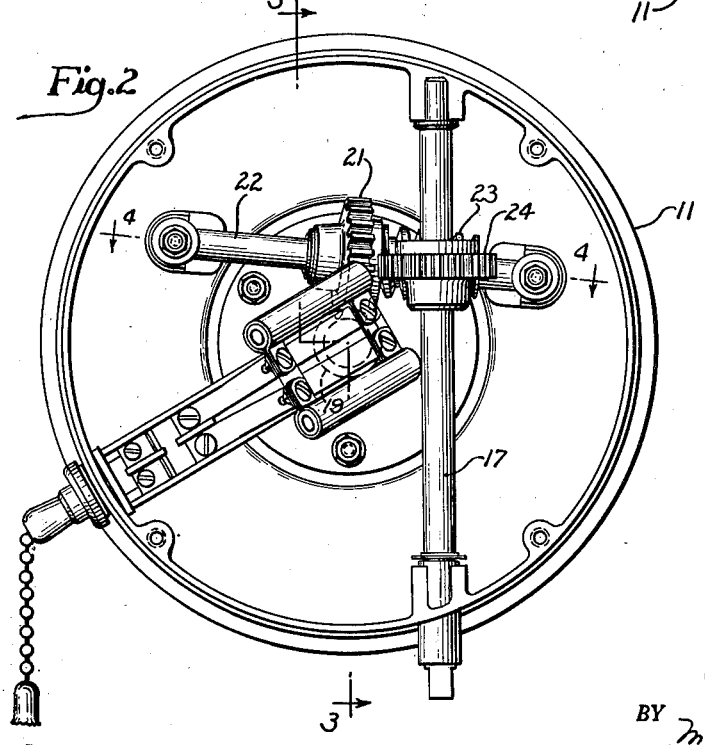

The oscillation mechanism of the fan comprises a crank arm 16 mounted on a vertical shaft 17 which is driven at relatively slow speed by the fan motor. Figs. 2 to 4, inclusive, show one advantageous, though illustrative, way in which this shaft may be driven. A shaft 18, which may be a continuation of the motor shaft, is driven at relatively high speed and carries a worm 19 driving a worm gear 21 mounted on a generally transverse shaft 22. The transverse shaft 22 also carries a worm 23 meshing with a worm gear 24 carried on the vertical shaft 17. It will be noted that these shafts are not in the position which shafts normally occupy in the conventional worm and worm gear type of drive. We have found that instead of using a conventional worm and worm gear we can employ for the worm a construction identical with a standard type of screw thread and that the worm gears may comprise ordinary spur gears in which no pitch of the teeth is required such as is required in the conventional worm gear. The shafts containing respectively the modified worm gear and worm, are placed at a slight angle to each other, as shown particularly by comparing shafts 17 and 22 in Fig. 2 or shafts 18 and 22 in Fig. 4, in order thus to obtain a suitable drive relation between the modified worm and worm gear. When two such connections are employed, as we do in the particular drive shown in Figs. 2 to 4, it is possible to place the shaft 18 truly horizontal and the shaft 17 truly vertical. In other words, even though the use of a screw thread type of worm and spur gear type of worm gear will require two shafts so interconnected having their axes in planes which do not bisect each other to form right angles, by reversing the angle of inclination where three such shafts are concerned, it is possible to have the driving and driven shafts' axes in planes at right angles to each other.

The crank arm 16 is split at 26 and a screw 27 clamps the split portion of the crank about a flat portion 28 of the vertical driving shaft 17 (see Fig. 3), so that such crank arm 16 will rotate with the shaft 17. The crank arm 16 is connected to one end of a link indicated generally by the reference character 29 and comprising a helical spring 31 with attaching brackets 32 and 33, reduced shanks of which extend into and are attached to the ends of the helical spring. Bracket 32 is apertured to receive a headed cap screw 34 which is screwed into a selected one of several holes 36 or into a threaded end aperture 37 of shaft 17 if no oscillation of the fan is desired. The particular hole 36 selected determines the magnitude of the oscillation, an arrangement generally common in oscillation mechanisms.

Swivel bracket 33 comprises toggle members 38 and 39 pivoted together intermediate their ends by a pin 41 at a position away from the center line or axis of the spring 31 to which the member 38 is connected. A compression spring 42 is carried in an open apertured portion 43 of member 38 and engages the adjacent portion of member 39 normally to hold the toggle members in the positions shown in Figs. 5, 7 and 8 (note, also, the dotted line position of Fig. 6). The toggle member 39 is apertured to receive a cap screw 47 for attaching the same to a stationary arm 48 carried by the support 10. Normally the axis of cap screw 47 which comprises the virtual pivot about which swivel bracket 33 moves is in line with the axis of the link 29.

Except for the provision of the overload release mechanism, the oscillating mechanism functions in the manner usual to electric fans. The shaft 17 rotates crank arm 16 in the direction indicated by the arrows in some of the views and the link 29 is alternately placed in tension and compression between the crank arm 16 and the stationary arm 48. Since the arm 48 is part of the support 10 and therefore immovable, the fan itself is forced to move by having its downwardly extending shank 14 pivot or swivel within the tubular portion 13. Our overload release mechanism is so constructed and arranged that the application of a greater than predetermined load to the link 29, either in tension or compression, will render the drive ineffective. It should be noted that while the crank arm 16 is the driving member, and the arm 48 the driven member, in the sense in which the power is applied, the entire crank arm 16 moves with the fan, and the terms driving and driven members are used in only a relative sense. In other types of installations in which our invention may be used, this relationship may not apply; and, of course, as previously stated, the motion involved may be nonrotary.

The operation of the overload release mechanism is shown particularly by Figs. 6 to 8, inclusive. In Fig. 6 the solid lines indicate the position of the parts when the spring link is in compression and at the time a load has been placed thereon sufficient to shorten the compression spring 42 and pivot the toggle members 38 and 39 about the pivot pin 41 and move the center line of the cap screw 47 to the left of the link axis as the parts appear in Fig. 6. This causes the spring 31 to collapse and assume generally the position shown in dotted lines in this figure. At the same time the excessive load is released from the compression spring 42 and the toggle members 38 and 39 return to their normal position. As the crank arm 16 continues to advance, the spring link 31 reaches its maximum position of buckle and then gradually straightens out as the crank arm 16 passes a center line until, at a position at approximately right angles to the axis of the link, the spring will return to normal position and normal drive will be resumed if there is no further obstruction. If there should be continued obstruction of the oscillation drive, however, the overload device will permit the fan to continue operating as long as the obstruction is continued.

Figs. 7 and 8 illustrate the action of the overload release when an obstruction is encountered while the link 29 is in tension. As Fig. 8 shows, the crank arm 16 can make a 180 degree rotation all the time applying greater tension to the link 29 and stretching the spring 31 without changing the position of the fan in any way. This would assume that the fan had reached its maximum movement as the link 29 was being driven in compression, that is to say, it had oscillated completely to one side, and something held the fan against return movement. The crank arm 16 could, under such circumstances, make a complete 360 degree rotation, during the first half of which the spring 31 would be stretched and under the last half of which the spring would return to normal. If we should assume stoppage of oscillation at any position of the fan, the overload release mechanism will function whether the stoppage should be merely temporary, i. e., for one operation, or long continued. Those skilled in the art will understand the manner in which the mechanism of our invention may be used in other installations, and, of course, it is not essential that both the compression and tension functions be combined in each installation.

In compression it is clear that the compression member comprising the link 29 or equivalent need not be pivotally secured, but may be supported only at one end, so long as the load is applied along the axis of the spring, and means is provided for shifting the point of application of the said load. A simple way of accomplishing the result is, of course, by the use of mutually pivoted toggle members, such as shown, with a compression spring or its equivalent between them.

While the invention has been described in detail so that those skilled in the art may practice the same, the scope thereof is defined in the claims.

We claim:

1. An overload release mechanism comprising a driving member, a driven member, a link pivotally connected to said members, at least a portion of said link comprising a helical spring having its axis aligned with said pivots, and means responsive to more than a predetermined pressure for shifting the position of one of said pivots with respect to the axis of the link, whereby to cause the same to collapse under load, said last mentioned means comprising a pair of mutually pivoted toggle members, one carrying said pivot and the other secured to the link, and a compression spring between said toggle members and normally holding the same in a position to maintain said pivot and link axis in alignment.

2. In an overload release mechanism, a member in compression comprising a helical spring, a support for said helical spring member comprising a pair of mutually pivoted toggle members, one such member having a shank for attachment to such spring, and the other shaped to receive a load at a point in alignment with the spring axis, and an auxiliary compression spring between said toggle members positioned to be compressed on application of an overload to thereby shift the point of application of the load and buckle the said helical spring.

3. In a fan oscillation drive, a driven crank arm, a stationary crank arm, a bracket pivoted to each such crank arm, a helical spring link secured between said brackets, and separate means including a resilient member for shifting the pivot of at least one of said brackets away from the axis of the spring.

4. In a fan oscillating drive, a driven shaft, a crank arm secured thereto and driven thereby, a stationary arm, a link between the said arms and comprising brackets pivoted to the said arms and a helical spring secured between the brackets, one of said brackets comprising a pair of mutually pivoted toggle members with a compression member between them normally holding the pivots between said brackets and arms in alignment with the spring axis, but, upon overloading, permitting shifting of one such pivot point away from the axis whereupon collapsing of said compression member occurs.

5. An overload release mechanism comprising a driving member, a driven member, a link pivotally connected to said members, at least a portion of said link comprising a helical spring having its axis aligned with said pivots, and means responsive to overload pressure for shifting the position of one of said pivots out of alignment with the axis of the link, whereby to cause the same to collapse under load, said last mentioned means comprising a support one part of which carries one of said pivots and another part of which is secured to an end of the link, said support including spring means normally holding said support in a position to maintain said pivots and spring axis in alignment, but, upon being subjected to an overload, said alignment being broken.

6. In an overload release mechanism, a member in compression comprising a helical spring, a support for said helical spring, one part of said support providing means for attachment to such spring at one end of said spring, another part of said support being shaped to receive a load at a point in alignment with the spring axis, said support including a resilient member positioned to be compressed on application of an overload to thereby shift the point of application of the load and buckle the said helical spring.

7. In a fan oscillation drive, a driven crank arm, a stationary crank arm, a bracket pivoted to each such crank arm, a coil spring link secured between said brackets, the axis of said coil spring being normally in alignment with said pivots, the bracket which is pivoted to the stationary crank arm having resilient means associated therewith whereby, upon said link being subjected to an overload, the alignment of said pivots with the axis of the coil spring is automatically broken.

8. In a fan oscillation drive, a driven crank arm, a stationary crank arm, a bracket pivoted to each such crank arm, a helical spring link secured between said brackets and the axis of which is normally in alignment with a straight line drawn through the pivot points of said brackets, the bracket which is pivoted to the stationary crank arm having resilient means associated therewith whereby, upon said helical spring link being subjected to an overload, the aforesaid alignment is automatically broken.

9. In a fan oscillation drive, a helical spring, a driven crank arm having a pivotal attachment adjacent one end of said helical spring, a stationary crank arm having a pivotal attachment adjacent the other end of said helical spring, the axis of said helical spring and the pivot points being normally in alignment, means associated with said stationary crank arm including a resilient member which serves to maintain said axial and pivotal alignment under normal load conditions but which, upon overload occurring. effects a shift of one of said pivot points in relation to the other whereby the helical spring is caused to buckle.

ARCHIE J. McMASTER.
WILLIAM H. KITTO.

REFERENCES CITED

The following references are of record in the file of this patent:

UNITED STATES PATENTS

| Number | Name | Date |
|---|---|---|
| 987,760 | Spellings | Mar. 28, 1911 |
| 1,597,752 | Aalborg | Aug. 31, 1926 |
| 2,368,775 | Perret | Feb. 6, 1945 |

FOREIGN PATENTS

| Number | Country | Date |
|---|---|---|
| 31,663 | Netherlands | July 15, 1933 |